United States Patent
He

(10) Patent No.: US 7,066,388 B2
(45) Date of Patent: Jun. 27, 2006

(54) SYSTEM AND METHOD FOR VERIFYING RFID READS

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 104 days.

(21) Appl. No.: 10/385,941

(22) Filed: Mar. 11, 2003

(65) Prior Publication Data

US 2004/0118916 A1 Jun. 24, 2004

Related U.S. Application Data

(60) Provisional application No. 60/434,519, filed on Dec. 18, 2002.

(51) Int. Cl.
*G06K 15/00* (2006.01)

(52) U.S. Cl. .............. 235/383; 235/385; 235/472.01; 235/472.02

(58) Field of Classification Search .......... 235/447, 235/454, 462.25–462.29, 472.01, 0.02, 383, 235/385; 902/6; 340/568.1, 568.2, 570
See application file for complete search history.

(56) References Cited

U.S. PATENT DOCUMENTS

| | | | | |
|---|---|---|---|---|
| 5,386,103 | A * | 1/1995 | DeBan et al. ............... | 235/379 |
| 5,493,107 | A | 2/1996 | Gupta et al. | |
| 5,640,002 | A * | 6/1997 | Ruppert et al. ......... | 235/462.46 |
| 5,821,523 | A * | 10/1998 | Bunte et al. ............ | 235/472.01 |
| 6,056,199 | A * | 5/2000 | Wiklof et al. .......... | 235/462.45 |
| 6,264,106 | B1 | 7/2001 | Bridgelall | |
| 6,318,636 | B1 | 11/2001 | Reynolds et al. | |
| 6,330,975 | B1 * | 12/2001 | Bunte et al. ............ | 235/472.01 |
| 6,371,375 | B1 | 4/2002 | Ackley et al. | |
| 6,545,705 | B1 * | 4/2003 | Sigel et al. ................. | 348/157 |
| 6,672,512 | B1 * | 1/2004 | Bridgelall .............. | 235/462.46 |
| 6,707,381 | B1 * | 3/2004 | Maloney ................. | 340/568.1 |
| 6,761,316 | B1 * | 7/2004 | Bridgelall et al. ..... | 235/462.46 |

FOREIGN PATENT DOCUMENTS

| | | |
|---|---|---|
| DE | 4341880 | 12/1993 |
| DE | 19720747 | 5/1997 |

* cited by examiner

*Primary Examiner*—Michael G. Lee
*Assistant Examiner*—Kimberly D. Nguyen
(74) *Attorney, Agent, or Firm*—Carter, DeLuca, Farrell & Schmidt LLP

(57) ABSTRACT

An RFID reader and imaging system is provided having a device for imaging an object associated with a tag whose RFID code is read by an RFID reader. The imaging device generates image data associated with the imaged object. Verification software executable on at least one processor of the system is provided for verifying whether the RFID code presented to be read and processed by the RFID reader and imaging system corresponds to the imaged object. The process of verification is performed by comparing the acquired image data or other data associated with the imaged object with the stored image data or other stored data corresponding with the RFID code read. Based on whether the acquired image data or other data substantially matches the stored image data or other stored data, the system verifies whether the appropriate RFID code was read.

20 Claims, 6 Drawing Sheets

SYSTEM AND METHOD FOR VERIFYING RFID READS

PRIORITY

This application claims priority to a U.S. Provisional Application filed on Dec. 18, 2002 and assigned U.S. Provisional Application Ser. No. 60/434,519, the contents of which are incorporated herein by reference.

BACKGROUND OF THE INVENTION

1. Field of the Invention

This invention relates to software verification, and particularly to a RFID reader and imaging system for verifying RFID reads using acquired and stored image data.

2. Description of the Related Art

Radio frequency identification (RFID) is an area of automatic identification in which a transponder, known generally as a tag, attached to an object communicates wirelessly with an RFID reader. RFID technology is used in a variety of applications including retail, industrial, transportation, tracking, security, animal identification and individual identification. Transfer of data via RFID technology may be used, for example, in indicating the presence of the object, such as in electronic article surveillance (EAS), for obtaining data associated with the object or for identifying the object. In an automatic identification system the tag is typically programmed with unique information, such as encoded data including an identifying code. The reader includes an antenna which emits radio carrier signals to activate the tag and read data from it, and a decoder for decoding the data read. The tag responds to the signal by modulating the carrier signal in accordance with the encoded data.

RFID technology allows for non-contact reading. The RFID reader may be a mobile reader, such as a hand-held reader, or a stationary reader such as a reader located in a tunnel, a door portal or a toll booth. The electromagnetic field generated by the antenna may be constant or activated by actuation means such as a sensor or a trigger. Advantages to RFID technology include non-contact reading without the need for line-of-sight interrogation.

The RFID reader and tag may be configured to operate using inductive coupling, electrostatic coupling, or electromagnetic coupling, in which induction of a current in a coil, induction of a voltage on a plate or a magnetic field, respectively, is used as a means for transferring data and/or power. The tag may be passive, in which case it contains no internal power source and is powered by the carrier signal radiated from the reader, or active, where it uses a battery for a partial or complete source of energy. The operational distance between the transponder and the reader depends on the configuration of the reader and tag used, as well as the frequency and power of the transmitted signals. Also, depending on the configuration of the RFID system, there may not be a need to orient the tag in a particular orientation for successful reading of the tag by the reader.

While the ability of the RFID reader to read a tag from an object while the object is typically located remote from the reader, not necessarily in a line-of-sight of the reader, and without orienting the tag in a particular orientation is advantageous in many applications, it is very possible that the reader might read a tag associated with an object that was not intended to be processed by the reader, resulting in a faulty read. In applications in which the read tag data is further processed, a faulty read will result in processing of faulty data, causing undesirable results, such as inaccurate inventories, charging an incorrect price for a consumer item, processing an unintended library book, charging a toll to an unintended vehicle, etc. Furthermore, noise, due to environmental conditions including moisture in the air and intervening objects, may corrupt data being read by the reader.

Accordingly, it is an object of the present operation to provide a system for verifying that a tag read by RFID methodology corresponds to the tag that was intended to be read and processed.

SUMMARY OF THE INVENTION

In accordance with the present invention, an RFID reader and imaging system is provided having an imaging device for imaging an object associated with a tag whose RFID code is read by an RFID reader. The imaging device generates image data associated with the imaged object. The system further includes a database storing RFID codes associated with a plurality of objects and complete or extracted image data associated with each stored RFID code. Verification software executable on at least one processor of the system is provided for verifying whether the RFID tag read and processed by the RFID reader and imaging system corresponds to the imaged object.

In accordance with an embodiment of the present invention, verification is performed by comparing the acquired image data or other data associated with the imaged object with the stored image data or other stored data corresponding with the read RFID code. If the acquired image data or other data substantially matches (i.e., within a predetermined image recognition certainty threshold or other system configured parameter) the stored image data or other stored data, then the system verifies that the appropriate RFID code was read. If the acquired image data or other data does not substantially match the stored image data or other stored data, then the system verifies that the appropriate RFID code was not read, or that the system contains an error. For example, the proper RFID code was read, but the corresponding stored image data or other stored data for the read RFID code is incorrect.

In accordance with another embodiment of the present invention an RFID reader and imaging system for verifying an RFID read is provided, in which the system includes RFID reader circuitry for performing the RFID read by receiving RFID tag data from an RFID tag and an imaging engine having an array of image sensors for sensing an image of an object and generating image data. The system further includes a database storing a plurality of RFID codes and image data associated with each respective RFID code of the plurality of RFID codes. The associated image data represents at least one image of at least one object having an RFID tag. The system also includes a processing unit for receiving the RFID tag data from the RFID reader circuitry and the generated image data from the imaging engine. The processing unit includes: an RFID decoding module including programmable instructions executable on the processing unit for decoding the received RFID tag data and generating an RFID code; a database query module including programmable instructions executable on the processing unit for accessing stored image data associated with an RFID code which matches the generated RFID code; and a comparator module including programmable instructions executable on the processing unit for comparing the generated image data with the accessed image data for determining whether the generated image data corresponds to the generated RFID code for verifying the RFID read.

In still another embodiment of the present invention a method is provided for verifying an RFID read. The method includes the steps of receiving an RFID code which was decoded from a set of RFID tag data obtained by reading an RFID tag during an RFID read operation; receiving image data obtained by an imaging operation performed substantially simultaneously with the RFID read operation; querying a database for accessing stored data corresponding to a stored RFID code which matches the received RFID code; and comparing the received image data with the accessed stored data for determining whether the received image data corresponds to the received RFID code. The method may further include receiving a plurality of RFID codes which were decoded from a plurality of respective sets of RFID tag data corresponding to a plurality of respective RFID tags read during the RFID read operation; accessing a set of stored data corresponding to respective stored RFID codes which match respective received RFID codes of the plurality of received RFID codes; and comparing the received image data with the respective sets of accessed data for determining the optimum correlation thereof for determining which received RFID codes of the plurality of received RFID codes corresponds to the received image data, and if a correlation does not exist, determining that an unsuccessful read occurred.

BRIEF DESCRIPTION OF THE DRAWINGS

Various embodiments of the invention will be described herein below with reference to the figures wherein.

DETAILED DESCRIPTION OF THE PREFERRED EMBODIMENTS

The present invention provides processes for verifying whether an RFID code transmitted from an RFID tag affixed to an object was read by an RFID reading device of an RFID reading system, or whether another RFID code corresponding to some other object was read. The other object could be located in the same general vicinity as the object whose RFID tag was intended to be read. Without performing a verification process, the RFID reading system would not be able to ascertain whether the RFID code of the intended RFID tag was read. This leads to several obvious disadvantages in different types of applications.

The present invention also provides an RFID reader and imaging system capable of verifying RFID reads. The system generally includes a processing system having at least one processor capable of executing a set of programmable instructions for performing the various functions of the invention. The system further includes circuitry for interrogating and receiving RFID tag data from an RFID tag affixed to an object and for providing the RFID tag data to the processing system. Image capture circuitry, such as an imaging engine, is also provided to the system of the present invention for capturing an image of the object and providing the image in the form of image data, such as a series of digital signals, to the processing system. The RFID read is performed substantially simultaneously with the imaging of the object.

The at least one processor of the processing system decodes the RFID tag data, processes the image data, accesses a database correlating RFID codes and respective associated image, and determines if the image data generated by the imaging engine corresponds with stored image data associated with the read RFID code for performing the verification process in accordance with the present invention. Accordingly, the system is able to verify whether the RFID tag which was interrogated and read by the RFID reader and imaging system of the present invention corresponds to the object imaged.

It is known in the art to use an imaging engine in an RFID reader. An RFID reader having an imaging engine is described in U.S. Pat. No. 6,264,106, assigned to Symbol Technologies Inc., which is incorporated herein by reference in its entirety. The imaging engine includes a two-dimensional array of cells or photo sensors, such as an area charge coupled (CCD) photo detector, which correspond to image elements or pixels in a field of view of the device, a lens assembly for focusing light incident on the image sensor and associated circuits coupled to the image sensor for producing signals corresponding to a two-dimensional array of pixel information for the imaged field of view.

System Overview

Figure 1:
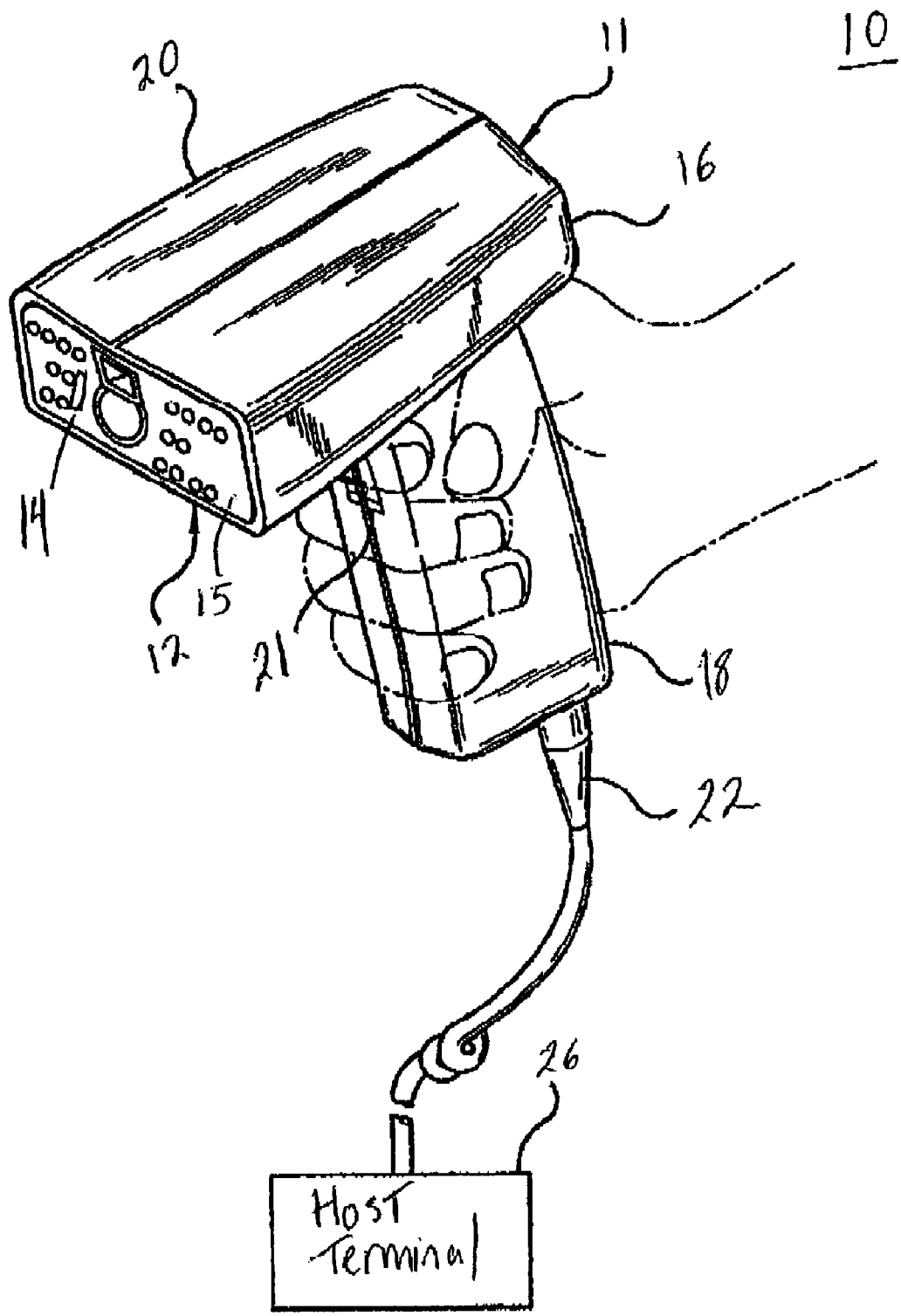
FIG. 1 is a perspective view of an RFID reader and imaging system in accordance with the present invention.

FIG. 1 is a perspective view of an integrated RFID reader and imaging system 10 including a reader 11 having an RFID reader block 12, an imaging engine 14, such as an imaging engine and associated circuitry known in the art, and processing means located internal or external to the reader 11, such as external host terminal 26, which may be used for various data compression, data decompression, decoding, imaging and RFID/image verification functions in accordance with the present invention as described below.

The reader 11 may be housed in one unit, such as the handheld reader shown in FIG. 1 having the RFID reader block 12 and imaging engine 14, or more than one unit having the RFID reader block 12 and/or imaging engine 14 integrated into a checkout counter, a doorway molding, a toll booth, a station on a conveyor belt, etc. Furthermore, the RFID reader block 12 and/or imaging engine 14 may be attached to or integrated with a portable, handheld computer device, such as a PDA and handheld computer device available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below. Furthermore, the reader 11 may include video control circuitry and frame grabbing circuitry for outputting video signals for displaying images on a terminal monitor.

In the exemplary reader 11 shown, the handheld reader 11 includes a housing 16 having a generally elongated handle or handgrip 18 and an upper portion 20 for housing the RFID reader block 12 and the imaging engine 14. The front face 15 of the imaging engine 14 appears at the forward end of the upper portion 20 of the reader 11. The cross-sectional dimensions and overall size of the handle portion 18 are ergonomically configured and sized such that the reader 11 can conveniently be held by the user's hand. Alternatively, the reader 11 may be shaped in the common form-factor of a handheld computer, with the imagine engine 14 looking out of either one end or the bottom of the reader 11, and with the body of the reader 11 designed for allowing the user to grab the complete unit in order to operate it.

The reader 11 is capable of being aimed at an object for receiving and reading a code transmitted from a tag affixed to the object and for simultaneously or successively obtaining and generating image data corresponding to the object. An actuation means, such as a manual trigger 21 is mounted in moving relationship on the handle portion 18 in a forward facing region of the reader 11. The user's forefinger (or possibly thumb, in the case of the alternative form-factor for the reader 11) is typically used to actuate the reader 11 by depressing the trigger 21 for actuating reading of the code transmitted from the tag while either simultaneously or successively imaging the reader's field of view to generate the image data. If the object is located within the field of view, the image data will contain data indicative of the object.

A flexible electrical cable 22 is provided to connect the reader 11 to the host terminal 26. In alternative embodiments, the cable 22 may also provide electrical power to the RFID reader block 12 and/or the imaging engine 14. In a further alternative embodiment, the cable 22 may be partially or fully replaced by wireless communication means such as radio frequency, optical or cellular communication means. In preferred embodiments, the reader 11 includes at least one host processor 302 (see FIG. 3) for processing the image data and/or the RFID tag data, and the processed information is transmitted via cable 22 from the reader 11 to the host terminal 26.

In other embodiments, digital RFID tag data and image data generated by the RFID reader block 12 and the imaging engine 14 are provided to the host terminal 26, where the reader 11 performs no processing or partial processing on the digital image data and digital RFID tag data. The host terminal 26 includes or accesses at least one processor, where the at least one processor may be connected to one or more peripherals or computing devices, such as a video monitor, and/or a network. A data compression module may be provided for compressing the RFID tag data and/or image data for storing within the reader 11 and/or host terminal 26. Compressed RFID tag data and/or image data can be transmitted to the host terminal 26 over electrical cable 22.

The transmission of RFID tag data and/or image data from the reader 11 to the host terminal 26 is initiated by pressing the trigger 21, by actuating another switch on the reader 11, and/or by placing the reader 11 within a cradle having a data output port connected to the host terminal 26. The RFID tag data and/or image data can be transmitted to the host terminal 26 via a hard-wired connection, such as the serial communication port of a personal computer when such a device is used as the host terminal 26, or a wireless connection, such as the IEEE 802.11 standard. The image data may be processed by a data processor of the host terminal 26 and selectively displayed on a monitor (not shown) of the system 10.

Figure 2:
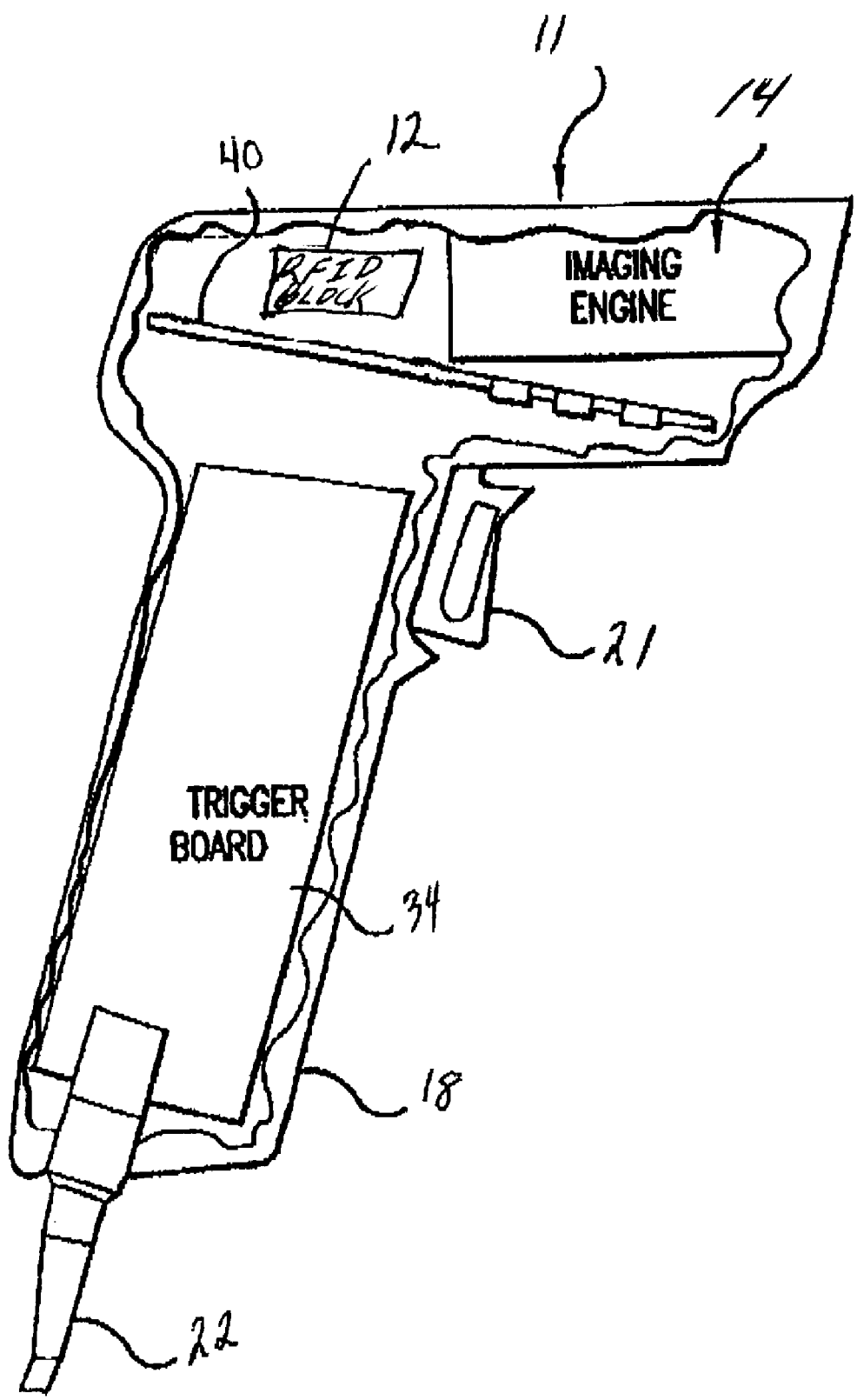
FIG. 2 is a sectional view of a RFID reader and imaging device of the system illustrated by FIG. 1.

FIG. 2 is a sectional view of one embodiment of the reader 11 in accordance with the present invention showing internal components of the reader 11, including the RFID reader block 12, the imaging engine 14, a trigger circuit board 34, and a control and logic circuit (CLC) board 40. The trigger circuit board 34 located in the handle portion 18 of the handheld reader 11 is electrically connected to switch means associated with the trigger 21 of the reader 11 and processes signals indicative of the operator's depressing of the trigger 21 in order to initiate, or continue reading of RFID codes and imaging of an object(s) within the field of view of the reader 11. It is contemplated that actuation means that are known in the art, such as a pedal actuator or an automatic actuator responsive to a sensed or processed signal may be included in addition to or instead of trigger 21 and trigger board 34. It is further contemplated that trigger 21 includes first and second triggers for independently or in combination actuating reading of the RFID tag code and imaging the object presented distally from the imaging engine 14 of the reader 11. A switch may also be provided to the reader 11 to disable the RFID reader block 12 and/or the imaging engine 14.

The CLC board 40, or portions thereof, may alternatively be provided externally from the reader 11, such as in the host terminal 26. In circumstances where the reader 11 of FIG. 2 is to be retrofitted from a laser line scan engine to an imaging engine 14, the imaging engine 14, RFID module and CLC board 40 can be inserted in place of the line scan engine and circuit board 40 in the reader 11. In this way previously designed toolings, housings and host devices may be employed and provide continuity in upgrading the code reading system. In preferred embodiments, the imaging engine 14 is less than two cubic inches in volume and is dimensioned to replace a moving laser beam scanning engine in a handheld optical code scanner, such as an SE1200 form factor scanning engine.

In alternate embodiments, the reader 11 includes a radio frequency board and an antenna which provide a mobile radio link to one or more data terminals, such as the host terminal 26. Electrical power for the reader 11 is provided via the host terminal 26 or by a rechargeable battery within the reader 11. An infrared data interface (IRDA) or multicontact shoe may also be provided to communicate data between the reader 11 and an external receiver or docking device, respectively. Compressed tag and/or image data may be transmitted to the host terminal 26 via a radio frequency link, IR communication link, or direct contact with the docking device.

It will be understood that aspects of the present invention are also applicable to RFID reader modules 12 and imaging engines 14 which are located in separate units which are in data communication with the host terminal 26. The RFID reader block 12 or the imaging engine 14 may alternatively be incorporated into a computer terminal in a fixed location or in a rotating turret. Such arrangements are particularly well adapted for using the imaging engine 14 as part of a video phone system which also uses the display, processing and I/O capabilities of the computer terminal.

It is contemplated that more than one frame of image data is generated by the imaging engine 14, either by generating still images or video data where the object is stationary or rotated, or more than one device having an imaging engine is provided. Accordingly, the object may be imaged from one or more angles for obtaining image data corresponding to various sides, views or faces of the object for providing more reliable verification results.

Figure 3:
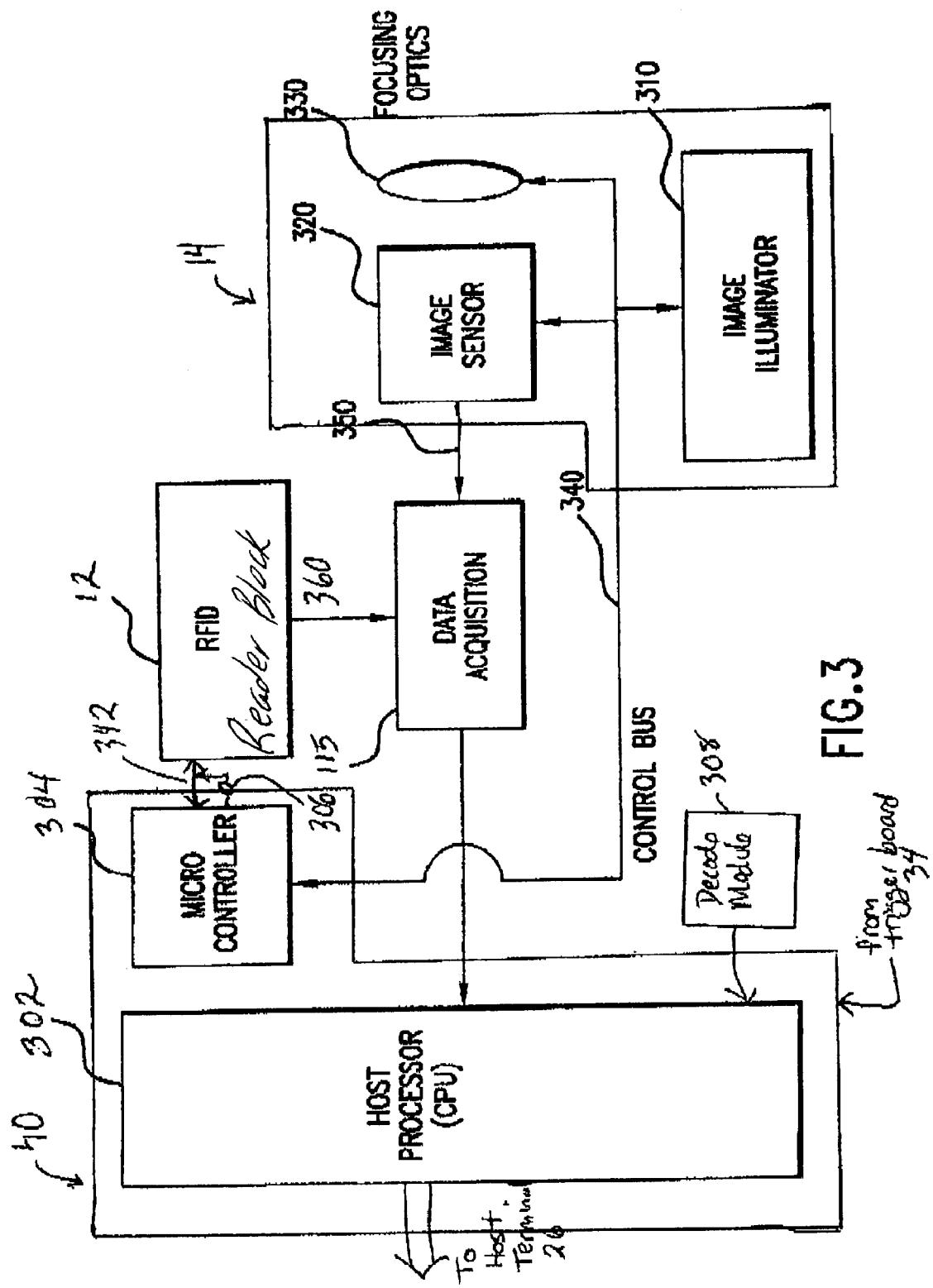
FIG. 3 is a block diagram of the RFID reader and imaging system illustrated by FIG. 1.

With respect to FIG. 3, an exemplary CLC board 40 is shown to include a host processor (CPU) 302, a microcontroller 304, and a crystal 306. An image illuminator 310 (optionally included) illuminates the field of view of the reader 11 using one or more illumination sources, such as laser LEDs or conventional lighting. Each sensor of an array of sensors included in image sensor 320 receives a reflected beam via focusing optics 330 and transmits an analog pixel signal 350 to data acquisition circuit 115. The RFID reader block 12 provides analog RFID tag data 360 to the data acquisition circuit 115. The data acquisition circuit 115 provides digital RFID tag and image data to the processor 302. A decode module 308, which is a software module executable on the processor 302, or alternatively on the host terminal 26, is provided for decoding the RFID tag data provided to the microprocessor and generating a corresponding RFID code, where the decode module 308 is stored on a storage medium (not shown) accessible by the processor, such as a DRAM or flash memory of the CLC board 40 or storage external to the reader 11, such as hard drive, floppy or CD-ROM.

Operation of the imaging engine 14 and the RFID reader block 12 is controlled by the microcontroller 304 via control buses 340 and 342, with synchronization provided by crystal 306. Trigger board 34 is connected to control unit 40 for providing actuation signals for actuating an RFID read and/or imaging process.

Figure 4:
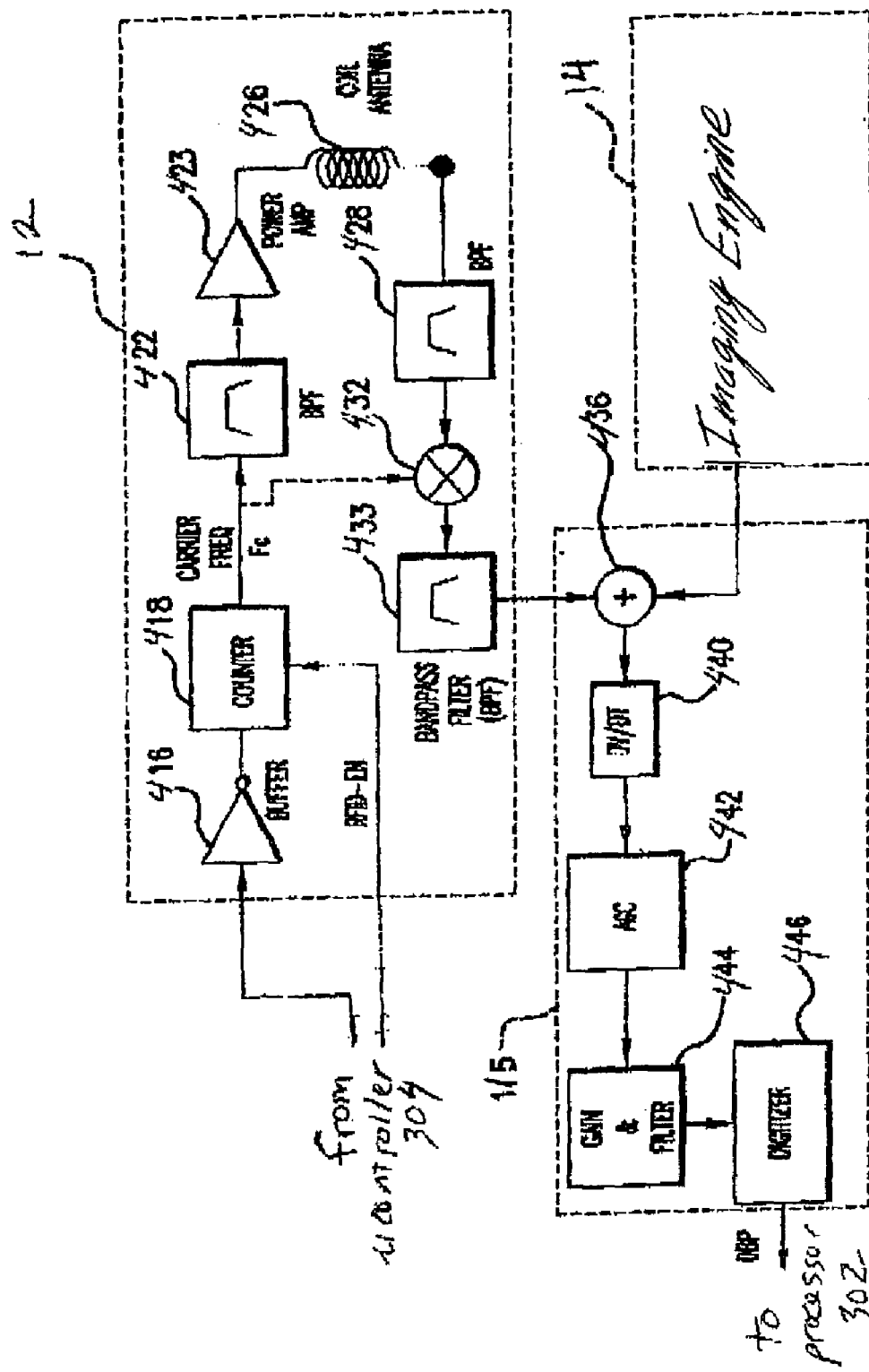
FIG. 4 is a functional block diagram of imaging engine, an RFID module and data acquisition circuitry in accordance with an embodiment of the present invention.

A functional block diagram of the RFID reader block 12, the imaging engine 14 and the data acquisition circuit 115 are shown in FIG. 4. The RFID reader block 12 detects the presence of an RFID tag and performs pre-processing on signals received from the RFID tag as follows. Amplifier 416 receives, amplifies and processes a clock signal from the CLC board 40 and provides a signal to counter 418. The CLC board 40 also provides an RFID enable signal to the counter 418 which enables the RFID reader block 12. Thereafter, the counter signal is preferably filtered by band-pass filter 422, amplified by power amplifier 423 and then propagated as an RF signal via antenna 426. The antenna 426 then determines, either through inductive coupling, through RF propagation, or other suitable RF method, whether there is an RFID tag in the RF field propagated by the antenna 426, and, if so, the characteristics of the RFID tag.

Thereafter, the antenna 426 transmits a data signal based on the RF information to a bandpass filter 428. The bandpass filter 428 then transmits the signal to multiplier 432, which samples the signal at a rate preferably controlled by the counter 418 and then transmits the sampled signal to another bandpass filter 433 which further pre-processes the data signal and transmits it to adder 436 of the data acquisition circuit 115. The particular electronics for detecting an RFID tag and pre-processing the data signal are well-known in the art and are not limited to the particular embodiment shown in FIG. 4.

Each signal from the RFID reader block 12 and imaging engine 14 is preferably transmitted to element 440 in the exemplary data acquisition circuit 115 shown. Element 440 can preferably be a peak detector, comparator, differentiator or other suitable device for determining the magnitude and duration of the peaks of the incoming signal. The signal is then further processed by automatic gain control 442, gain and filter block 444, and digitizer 446, after which it is transmitted as a suitable digital signal to the processor 302. The signal may be transmitted to the processor 302 by a suitable interface for transmitting digital signals.

In one embodiment, the imaging engine 14 includes circuitry for processing image signals output by the array of sensors of the image sensor 320, such as, for example, buffering, amplifying, filtering, and digitizing the signals. In this embodiment, interface circuitry is included for interfacing the imaging engine 14 and the processor 302 for direct transmission of these image signals to the processor 302 for processing thereof.

By utilizing a single CLC board 40, a single data acquisition circuit 115, a single interface between the processor 302 and microcontroller 304, and a single digital signal path between the data acquisition circuit 115 and the CLC board 40, the imaging/RFID circuitry can be substantially reduced in size. At this reduced size, the circuitry can be formed to fit into space which is currently allocated for readers that provide only scanning capabilities, e.g., a reader having a space created to contain the aforementioned SE1200 scanning engine.

When a simultaneous RFID read and imaging process is requested by an operator, the RFID reader block 12 and the imaging engine 14 are controlled by the CLC circuit 40 to be activated in succession, where the data acquisition circuit 115 receives and processes the signals therefrom successively. The CLC circuit 40 receives the image and RFID tag data successively from the data acquisition 115 and correlates the received data for verifying if the received image data corresponds to the received RFID tag data. Alternatively, the CLC circuit 40 activates the RFID reader block 12 and the imaging engine 14 simultaneously, where the signals output by at least one of the RFID reader block 12 and the imaging engine 14 are buffered and provided successively to the data acquisition circuit 115.

In an alternate embodiment of the invention, the CLC circuit 40 controls the RFID reader block 12 and imaging engine 14 to simultaneously image an object and process a signal transmitted by an RFID tag. This may prove useful, for example, for applications in which speed is a critical factor in processing the signals and verifying that the RFID tag data corresponds to the image data, such as in an assembly line application.

Figure 5:
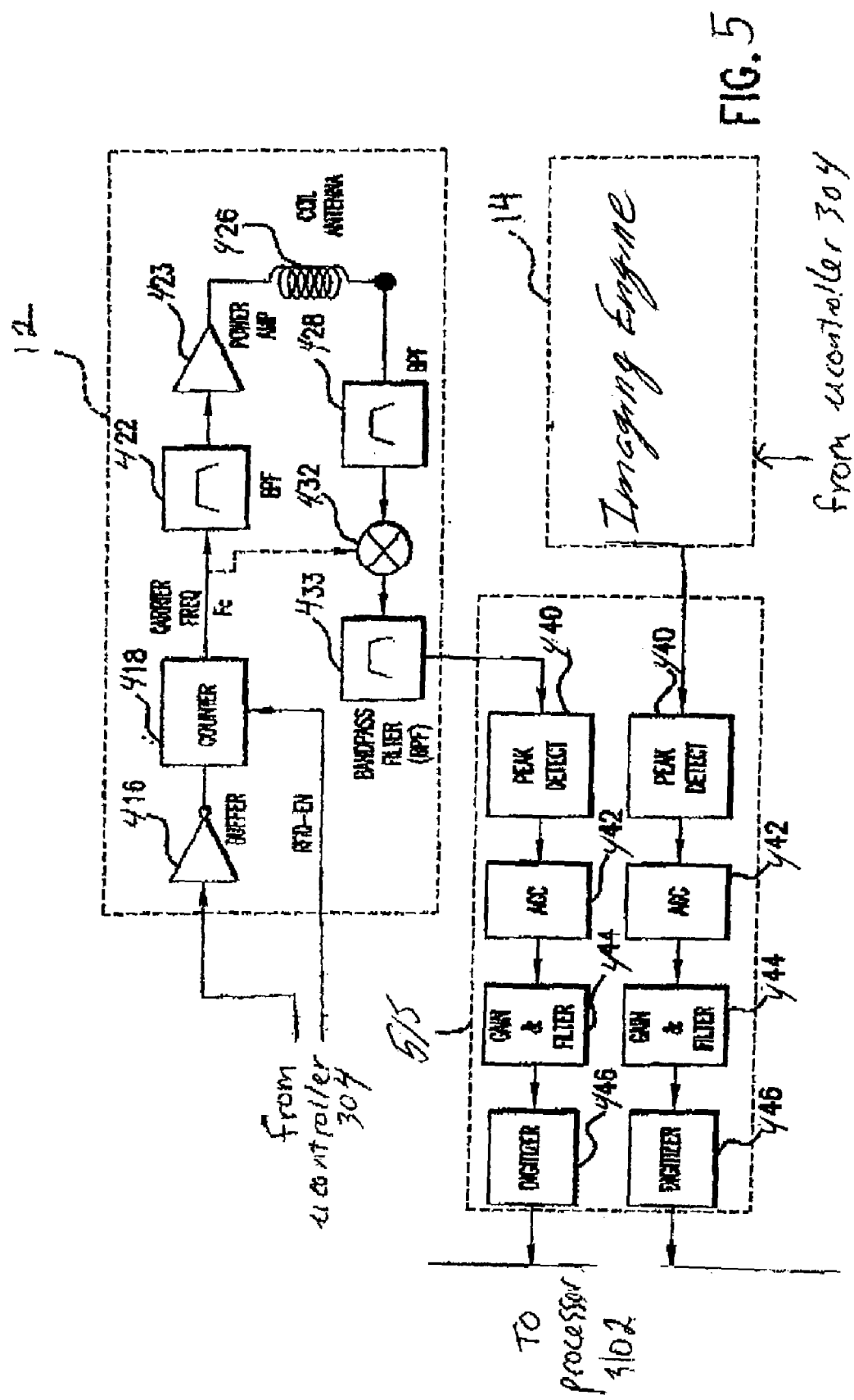
FIG. 5 is a functional block diagram of the imaging engine, the RFID module and the data acquisition circuitry in accordance with another embodiment of the present invention.

FIG. 5 shows a block diagram of one embodiment of a simultaneous imaging/RFID circuit that is capable of simultaneously processing an RFID signal generated by the RFID reader block 12 and an imaging signal generated by the imaging engine 14 having a data acquisition circuit 515 which includes two separate data transfer paths. Each path preferably includes peak detector 440, automatic gain control 442, gain and filter block 444, and digitizer 446. This particular embodiment eliminates the need for element 436 because the data signals from each of the imaging engine 14 and the RFID block 12 are transmitted directly to peak detector 440. The CLC board 40 may be configured to receive two signals simultaneously through the data acquisition circuit 515.

Using RFID technology, it is possible to read RFID tags that are not in a line of sight of the reader 11. For example, a reader 11 may be used in a supermarket aisle to obtain a price on a particular item, however a plurality of grocery items provided with RFID tags may be in the vicinity. Thus, when the reader 11 is operated to perform an RFID and image verification operation, a plurality of RFID tags may be read while the desired object is imaged. Accordingly, the decoder module 308 generates a plurality of RFID codes corresponding to respective read RFID tags, while only one of the RFID codes corresponds to the RFID tag that corresponds to the desired item. The imaging engine 14 generates image data that corresponds to the desired object which it is aimed at, i.e., lies within the field of view of the reader 11.

Verification Processing

Figure 6:
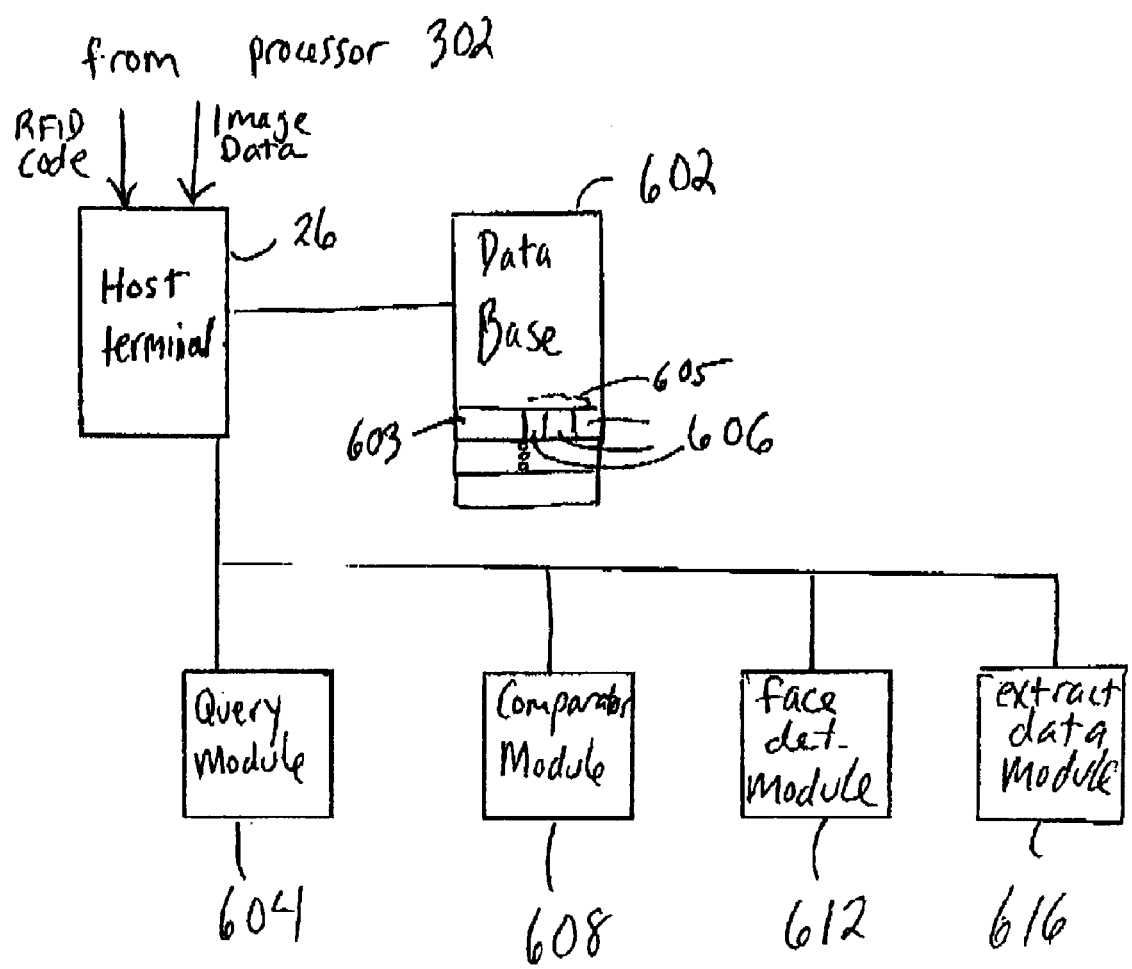
FIG. 6 is a block diagram of a host terminal, database module and associate software modules of the RFID reader and imaging system of FIG. 1.
Figure 1:
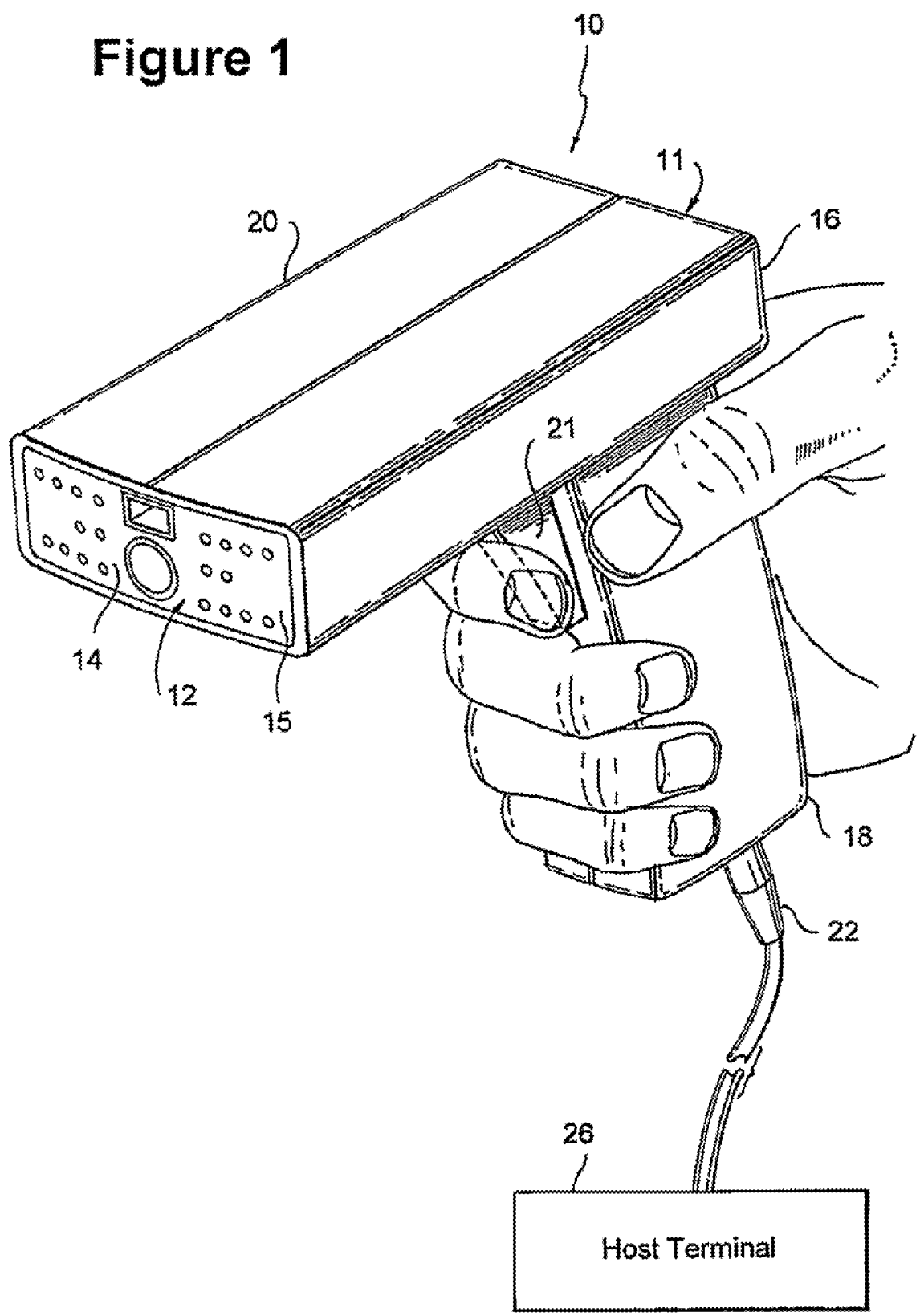
Figure 2:
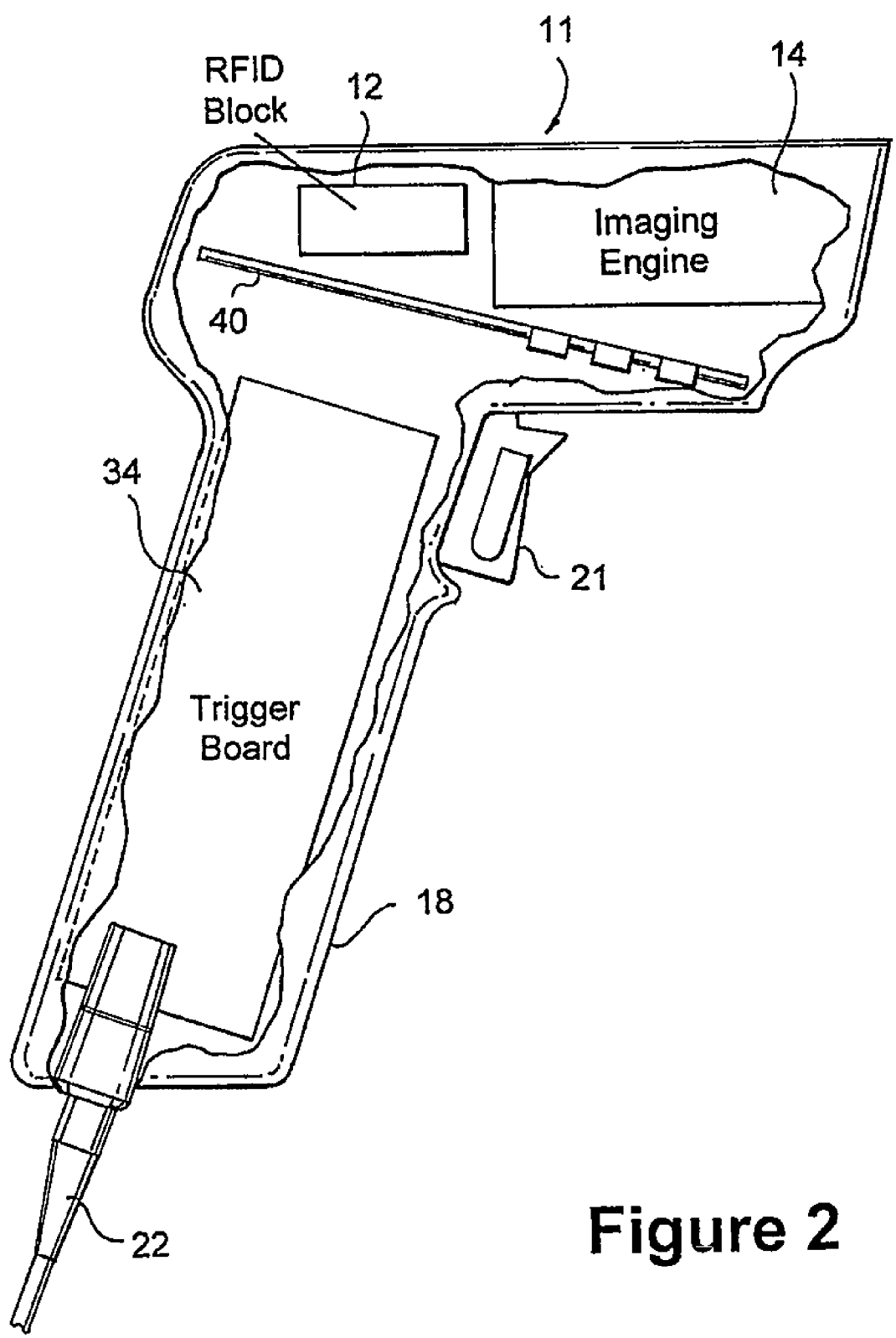
Figure 3:
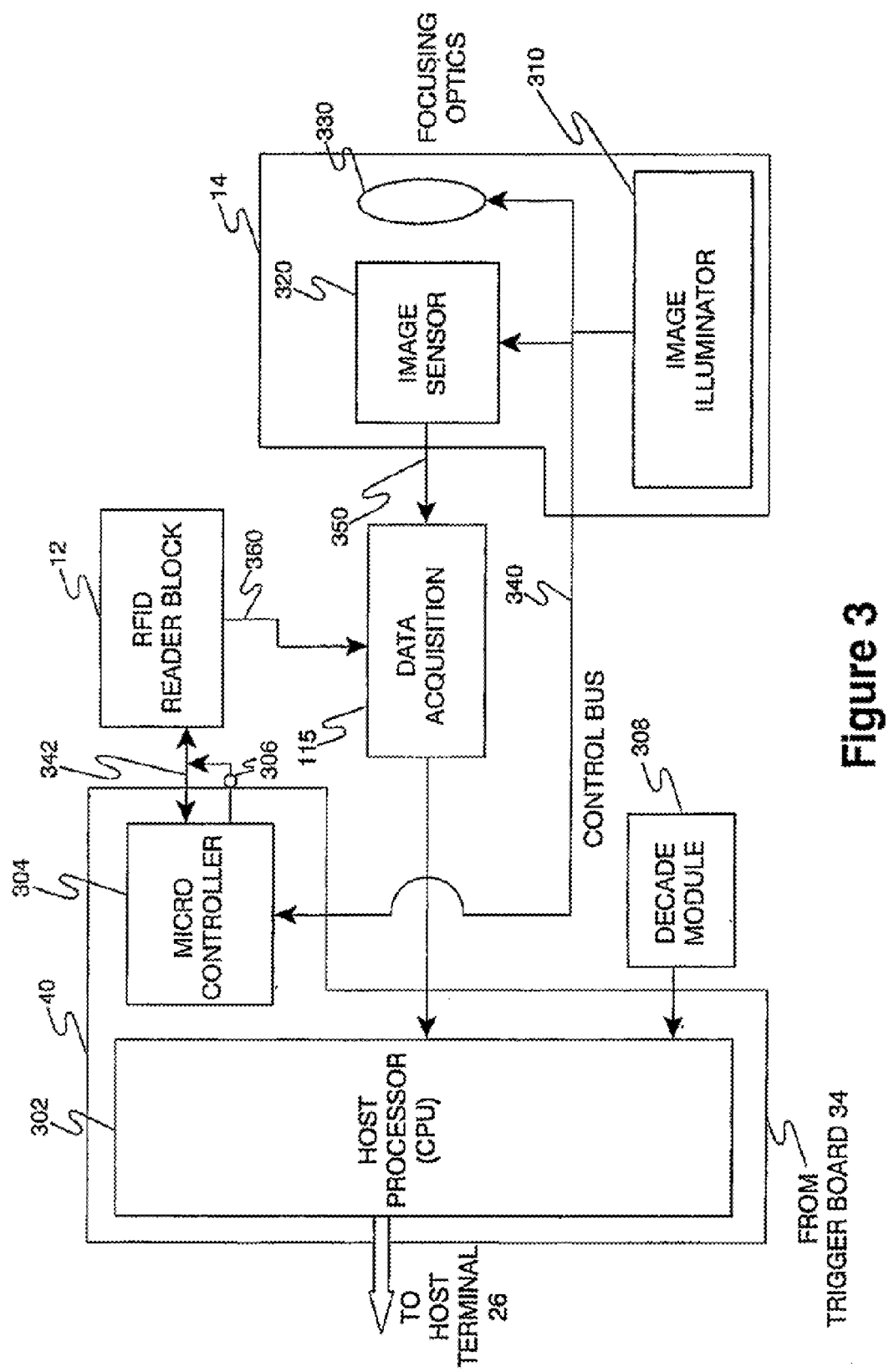
Figure 4:
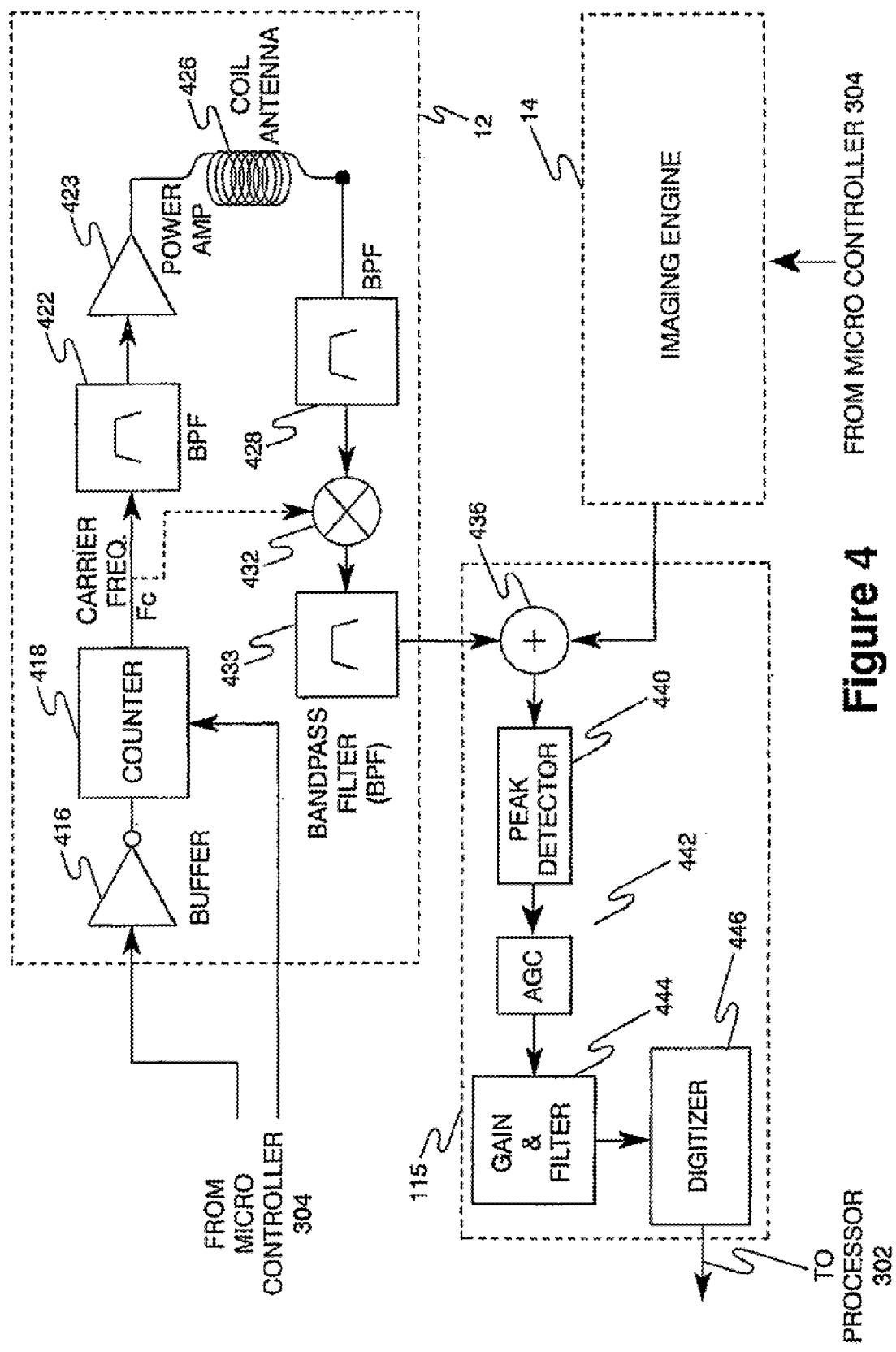
Figure 5:
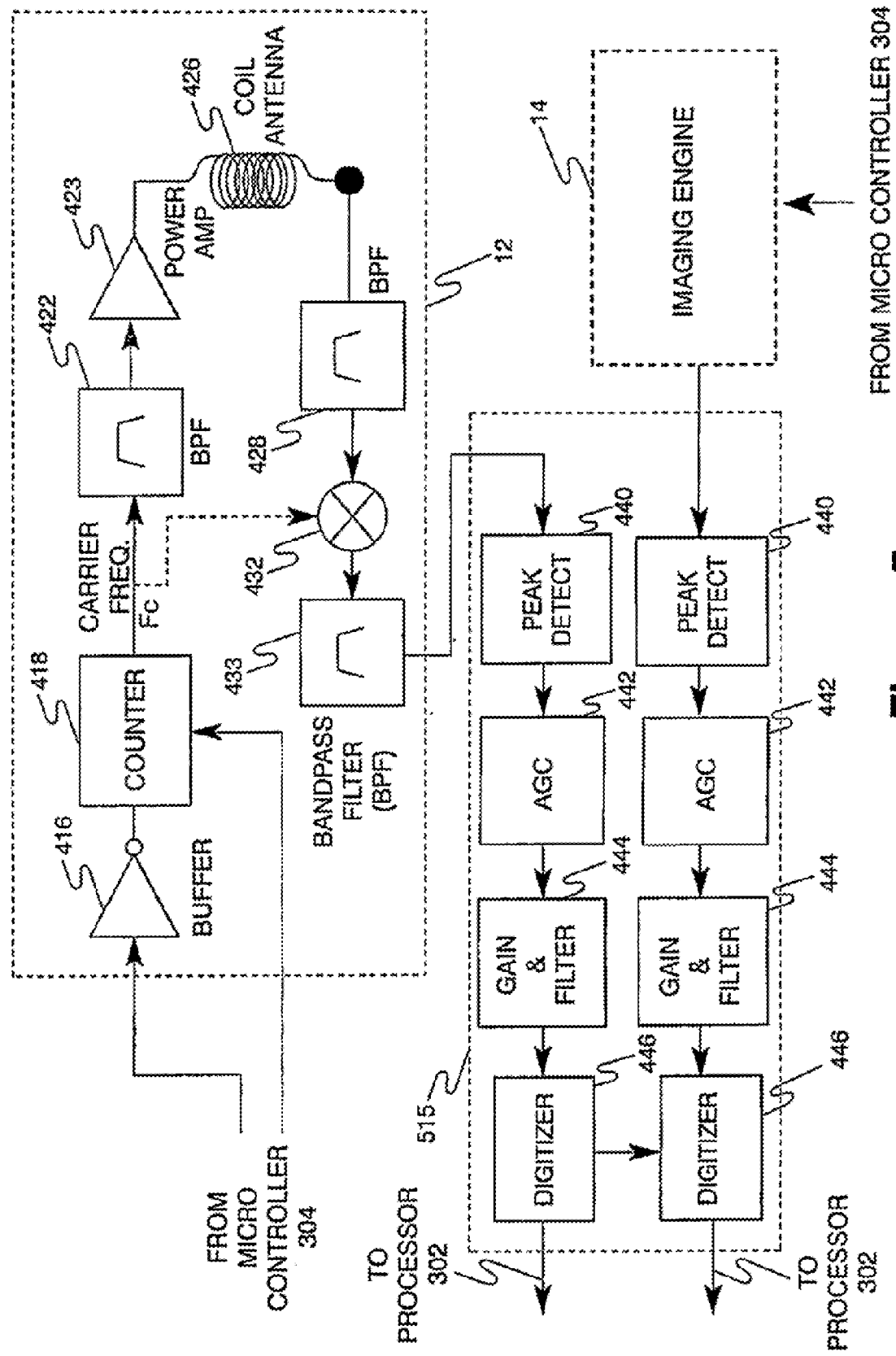
Figure 6:
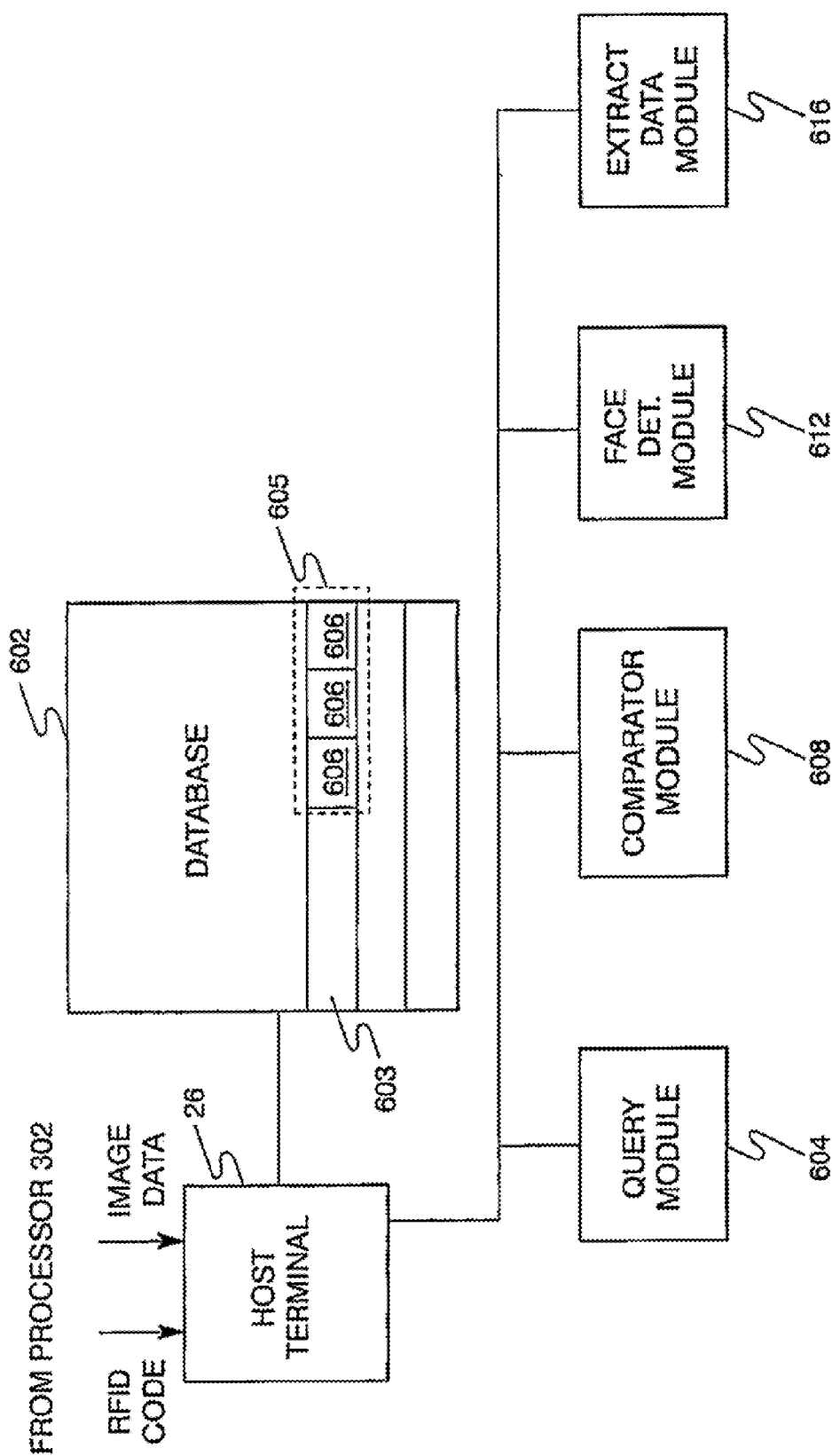

Preferably, verification processing is performed by a processor of the host terminal 26. Verification processing may alternatively be performed partially or entirely by a processor, such as processor 302, having access to database 602, where the processor and/or the database 602 is housed within the reader 11. With reference to FIG. 6, the host terminal 26 receives one or more RFID codes, where one of the RFID codes corresponds to the desired object, and image data corresponding to the desired object from the processor 302. The host terminal 26 has access to database 602 which stores a plurality of RFID codes 603 and respective associated image data 605 or links thereto, where the associated image data 605 represents an object; that is, the object assigned the respective RFID code.

The stored image data 605 preferably includes one or more image entries 606, such as an entry for each side, view, or face (or major faces (e.g., front and back)) of the object. The resolution of the stored image data 605 may be comparable to, greater than or less than the resolution of the image data generated by the reader 11. The image entries 606 may include, in addition to or instead of image data, data indicative of the object, such as dimensions of the object, text identifying the object and/or included on a face of the object, and extractions or derivations from the actual image data, such as quantitative data or qualitative data derived or extracted from actual image data by an extraction algorithm, such as an algorithm for performing a color analysis (such as for obtaining a breakdown of number of pixels per color, dominant color, color ratios, etc.), a reflectivity analysis, a shape analysis, a texture analysis, light contrast analysis or edge detection, for determining one or more parameters or characteristics of the object being imaged. The extracted data stored may be selected pixel data of the received image data, such as with minimal or no background image data, or sampled pixel data.

A query module 604 and a comparator module 608 are provided. Each of the modules 604, 608 includes a set of programmable instructions capable of being executed by a processor, such as the processor 302. A face determination module 612 and/or an extract data module 616 are further provided having additional sets of programmable instructions capable of being executed by a processor, such as the processor 302, for performing additional functions in accordance with the present invention.

The query module 604 queries the database 602 for retrieving image data 605 corresponding to the received one or more RFID codes, and accesses and/or retrieves stored data, preferably image data, corresponding to a stored RFID code that matches each received RFID code. The comparator module 608 compares received image data and retrieved (accessed) image data 605 for determining if a substantial match exists therebetween and for determining if the RFID code read corresponds to object that was imaged.

When retrieving stored data corresponding to more than one stored RFID code matching the respective received RFID codes, the comparator module 608 compares the received image data with the retrieved data associated with each of the respective matching RFID codes to determine the best correlation thereof in accordance with correlation criteria. Accordingly, the stored RFID code that corresponds to the best correlating retrieved data is determined to best correspond with the received image data. Furthermore, the received RFID code that matches the best corresponding stored RFID code is determined to be the received RFID code that best corresponds to the desired object. If a correlation doesn't exist, a determination is made that an unsuccessful read, such as a misread, a no decode, a no read, etc., occurred.

The face determination module 612 includes an algorithm for analyzing the received image data (or, when there is more than one image, each respective image thereof) to determine which image data corresponds to a face(s) of the object best imaged by the reader 11, i.e., corresponds to a dominant face of the object imaged by the reader 11, and discards the image data that does not correspond to the imaged face(s).

The extract data module 616 includes an extraction algorithm to extract information from the received image data, such as by extracting or selecting pixel data corresponding to the received image data, selecting pixel data with minimal or no background image data, selecting data associated with the best imaged face, discarding pixel data of border areas, and sampling the pixel data. The extract data module 616 also uses an extraction algorithm for deriving one or more parameters or characteristics of the object being imaged. The extraction algorithm used is similar to the extraction algorithm previously used for deriving or extracting the image data 605 stored in the database 602. For instances in which the extraction of data is a function of the distance between the object and the image sensor 320, such as when the extraction data includes determination of the dimensions of the object, the distance may be determined, such as by using aiming technology, as in known in the art.

In an alternate embodiment, such as when the retrieved image data 605 is not extracted data, the extract data module 616 performs an extraction algorithm on both the retrieved image data 605 and the received image data. In one embodiment, the comparator module 608 performs sufficient recognition processing for recognizing similarities between the received image data and the retrieved image data 605, such that the extract data module 616 and the face determination module 612 can be omitted.

It is noted that the series of programmable instructions corresponding to one or more of the modules described herein can be stored on a computer-readable medium, such as a CD, smart card, 3.5" diskette, etc.

An exemplary operation of the verification process will now be described. The host terminal, initially, receives image data and an RFID code from the processor. The face determination module is then executed to extract the dominant face in the image (or respective images) included in the received image data. Next, the extract data module discards excess data from the received image data. Then, the extract data module extracts data from the received image data using an algorithm for extracting data, which is congruent with the image data, stored in the database. Following this, the query module queries the database to retrieve image data corresponding to the received RFID code. Finally, the comparator module compares the extracted and/or received image data to the retrieved image data (or other stored data).

The extracted and/or received image data is preferably compared to the stored image data 605 corresponding to more than one respective face until a substantial match is found between the extracted and/or received image data and the stored image data 605. The degree of similarity or level of confidence required for a match may be predetermined or selectively weighted (i.e., within a predetermined image recognition certainty threshold or other system configured parameter).

If a substantial match does not exist, the comparator module 608 determines that the wrong RFID tag code was read, perhaps an RFID tag code corresponding to another object in the same vicinity as the object whose RFID tag was intended to be read. The comparator module 608 may also determine that the proper RFID tag code was read, but the database 602 incorrectly correlates the read RFID tag code with at least one respective stored image of the stored image data 605. If a match does exist, the comparator module 608 determines that the RFID tag code read corresponds to the object imaged.

Exemplary applications for the verification process include imaging a license plate on a car having an RFID tag passing through an RFID reader booth, extracting image data corresponding to the license plate, performing optical character recognition (OCR) on the extracted image data for determining the characters on the license plate, and comparing the license plate associated with the RFID code read and stored within the database 602 with the retrieved and extracted characters. Similarly, character data may be extracted and recognized by OCR optical codes, such as character codes on stickers having RFID tags affixed to produce or other products, as well as characters printed on packaging or badges having an RFID tag, such as a name on a security badge.

In a further security application, the verification process acquires imaged biometric features, such as fingerprints, retina prints, markings on animal hide, or face maps, and compares these acquired images with corresponding stored image data or other data stored in the database 602. In a retail application, such as at a grocery store, a packaged product having an affixed RFID tag may be presented to the reader 11. The reader 11 reads the affixed RFID tag to generate an RFID code and image a face of the package to generate image data. The extract data module 616 processes the image data to obtain data corresponding to one face. The database 602 may have six faces stored in association with the code that correlates to the read RFID tag data. The comparator module 608 compares the image data corresponding to the image face with each of the stored six faces until a substantial match is found. If a substantial match is not found, it is determined that the read RFID tag does not correspond to the package that was imaged, or there exists a system error.

In another embodiment still, the reader 11 is provided with imaging engine 14, however the RFID reader block 12 is not included, or alternatively, is included, but not activated. The reader 11 is used to image an object and a code associated with the object. A combination of optical code recognition (OCR) software and imaging verification software is used for processing data generated by the imaging of the object and the code for identifying the object. The code is formed of one or more characters or symbols, such as, for example, a barcode, a logo or alphanumeric characters or a combination thereof printed on a sticker or tag that is associated with and preferably affixed to, for example, a produce item, a nonperishable grocery item, an item on an assembly line, or a garment.

In operation the reader 11 is brought into proximity of an object and the imaging engine 14 captures an image of the object and a code associated with the object and generates respective corresponding object image data and code image data. The code data generated by the imaging engine 14 is provided to a the processor 302 and/or the host terminal 26 for processing by an optical character recognition (OCR) software module (such as when the symbol imaged includes alphanumeric characters and/or a logo) or an optical code decoding (OCD) module (when the symbol imaged is an optical code such as a bar code). The OCR module and the OCD module are software modules executable on the processor 302, or alternatively on the host terminal 26.

The OCR module performs character recognition processing on the image data received from the imaging engine 14 and generates at least one possible digital code that corresponds to the imaged code. The OCR module is generally capable of recognizing characters that belong to a predetermined set of characters. The OCD module decodes the optical data and generates a digital code corresponding to the image data.

The at least one possible digital code generated by the OCR module and/or the OCD module are provided to an image verification module that is a software module executable on the processor 302, or alternatively on the host terminal 26. The image verification module accesses database 602, where database 602 stores an optical code associate with respective RFID codes of the plurality of RFID codes, or instead of respective RFID codes. The image verification module selects a digital code of the at least one possible codes and/or verifies the at least one possible code. The image verification module compares the stored image data associated with each stored optical code that matches each respective code of the at least one possible code to the image data received from the image engine 14 until it determines which stored image data correlates or best correlates to the received image data in accordance with correlation criteria of the image verification software.

The code associated with the correlated or best correlated stored image data is determined to be the code that is associated with the object for identifying the object. If none of the stored image data compared to the received image data correlates to the received image data, then the image verification software determines that an unsuccessful read, such as a misread, a no decode, a no read, etc., has occurred.

The imaging of the object and the code may be performed by performing two imaging operations for individually imaging and generating the object image data and the code image data. In another embodiment object and code are imaged in one imaging operation and the code image data may be extracted from the object data. Imaging of the object and code may be performed simultaneously or sequentially. First and second image engines may be provided for imaging the object and code, respectively.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

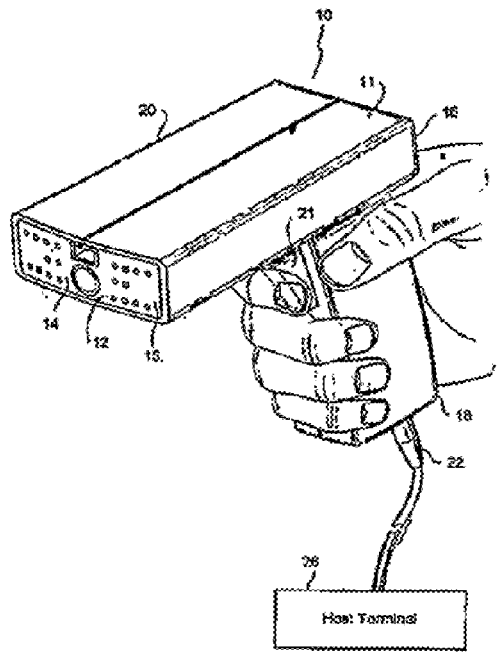

The invention claimed is:

1. An RFID reader and imaging system for verifying an RFID read for determining if an RFID tag that was read is an RFID tag that was intended to be read, said system comprising:

RFID reader circuitry for reading an RFID tag including receiving RFID tag data from the RFID tag;

an imaging engine having an array of image sensors for sensing an image of an object and generating image data corresponding to said object;

a database storing a plurality of RFID codes and image data associated with respective RFID codes of the plurality of RFID codes, wherein the associated image data represents at least one image of at least one object having an RFID tag; and a processing unit for receiving the RFID tag data from the RFID reader circuitry and the generated image data from the imaging engine, said processing unit comprising:

an RFID decoding module including programmable instructions executable on the processing unit for decoding the received RFID tag data and generating an RFID code;

a database query module including programmable instructions executable on the processing unit for accessing stored image data associated with an RFID code which matches the generated RFID code; and a comparator module including programmable instructions executable on the processing unit for comparing the generated image data, including an image of the generated image data, with the accessed image data, including an image of the accessed image data, for determining whether the generated image data corresponds to the generated RFID code for verifying the RFID read for determining if the RFID tag corresponds to the object, and if so, concluding that the RFID tag is the RFID tag intended to be read, and if not, concluding that the RFID tag corresponds to a different object and is not the RFID tag intended to be read.

2. The system according to claim 1, wherein the imaging engine and the RFID reader circuitry are housed within an integrated RFID reading and imaging device.

3. The system according to claim 1, wherein signals generated by the imaging engine and the RFID reader circuitry are processed successively by signal processing circuitry.

4. The system according to claim 1, wherein the image data associated with respective RFID codes of the plurality of RFID codes includes a plurality of images.

5. The system according to claim 4, wherein the comparator module includes means for comparing the generated image data with at least one of the plurality of images corresponding to the generated RFID code.

6. The system according to claim 4, wherein respective image data entries of a plurality of image data entries of image data associated with respective RFID codes include images corresponding to different views of the at least one object.

7. The system according to claim 1, wherein the image data associated with respective RFID codes includes data indicative of at least one characteristic of the at least one object.

8. The system according to claim 1, wherein the image data associated with the respective RFID codes includes data extracted from an image of the at least one object.

9. The system according to claim 1, wherein the processing unit further comprises a face determination module for determining data of the generated image data corresponding to at least one face of the object imaged by the imaging engine.

10. The system according to claim 1, wherein the processing unit further comprises a data extraction module including programmable instructions executable on the processing unit for extracting data from the generated image data.

11. The system according to claim 10, wherein the extracted data is indicative of at least one characteristic of the object imaged by the imaging engine.

12. The system according to claim 1, wherein;
the RFID reader receives RFID tag data from more than one RFID tag;
the RFID decoding module generates an RFID code which corresponds to respective RFID tag reads;
the database query module accesses respective stored image data associated with respective RFID codes which match respective generated RFID codes; and
the comparator module compares the generated image data with respective accessed image data for determining the best correlation thereof for determining the best correspondence between the generated image data and one of the generated RFID codes, and that the generated RFID code having the best correspondence corresponds to the RFID tag intended to be read, and if a correlation does not exist, determining that a misread occurred.

13. A method for verifying an RFID read for determining if an RFID tag that was read is an RFID tag that was intended to be read, the method comprising the steps of:
receiving an RFID code which was decoded from a set of RFID tag data obtained by reading an RFID tag during an RFID read operation;
receiving image data corresponding to an object and obtained by an imaging operation performed substantially simultaneously with the RFID read operation;
querying a database for accessing stored data corresponding to a stored RFID code which matches the received RFID code; and
comparing the received image data, including an image of the received image data, with the accessed stored data, including an image of the accessed stored data, for determining whether the received image data corresponding to said object corresponds to the received RFID code corresponding to said RFID tag for determining if the RFID tag corresponds to the object, and if so, concluding that the RFID tag is the RFID tag intended to be read, and if not, concluding that the RFID tag corresponds to a different object and is not the RFID tag intended to be read.

14. The method according to claim 13, wherein:
the receiving the RFID code step includes receiving a plurality of RFID codes which were decoded from a plurality of respective sets of RFID tag data corresponding to a plurality of respective RFID tags read during the RFID read operation;
the querying step includes accessing a set of stored data corresponding to respective stored RFID codes which match respective received RFID codes of the plurality of received RFID codes; and
the comparing step includes comparing the received image data with the respective sets of accessed data for determining the optimum correlation thereof for determining which received RFID codes of the plurality of received RFID codes corresponds to the received image data and that the determined RFID code is decoded from RFID tag data that corresponds to the RFID tag intended to be read, and if a correlation does not exist, determining that a misread occurred.

15. A computer-readable medium storing a series of programmable instructions configured for execution by at least one processor for performing an RFID verification for determining if an RFID tag that was read is an RFID tag that was intended to be read, the method comprising the steps of:
receiving an RFID code which was decoded from a set of RFID tag data obtained by reading an RFID tag during an RFID read operation;
receiving image data corresponding to an object and obtained by an imaging operation performed substantially simultaneously with the RFID read operation;
querying a database for accessing stored data corresponding to a stored RFID code which matches the received RFID code; and
comparing the received image data, including an image of the received image data, with the accessed stored data, including an image of the accessed stored data, for determining whether the received image data corresponding to said object corresponds to the received RFID code corresponding to said RFID tag for determining if the RFID tag corresponds to the object, and if so, concluding that the RFID tag is the RFID tag intended to be read, and if not, concluding that the RFID tag corresponds to a different object and is not the RFID tag intended to be read.

16. A verification system for verifying an RFID read for determining if an RFID tag that was read is an RFID tag that was intended to be read, comprising:
  means for receiving an RFID code which was decoded from a set of RFID tag data obtained by reading an RFID tag during an RFID read operation;
  means for receiving object data corresponding to an object, wherein the object data was sensed substantially simultaneously with the RFID read operation;
  means for querying a database for accessing stored data corresponding to a stored RFID code which matches the received RFID code; and
  means for comparing the received object data with the accessed data for determining whether the received object data corresponding to said object corresponds to the received RFID code corresponding to said RFID tag for determining if the RFID tag corresponds to the object, and if so, concluding that the RFID tag is the RFID tag intended to be read, and if not, concluding that the RFID tag corresponds to a different object and is not the RFID tag intended to be read.

17. The verification system according to claim 16, wherein the stored data corresponding to the generated RFID code is image data and the received object data is image data obtained by an imaging engine.

18. The verification system according to claim 17, wherein the received object data is derived from the image data.

19. The verification system according to claim 16, wherein:
  the means for receiving the RFID code includes means for receiving a plurality of RFID codes which were decoded from a plurality of respective sets of RFID tag data corresponding to a plurality of respective RFID tags read during the RFID read operation;
  the means for querying includes means for accessing a set of stored data corresponding to respective stored RFID codes which match respective received RFID codes of the plurality of received RFID codes; and
  the means for comparing includes means for comparing the received object data with the respective sets of accessed data for determining the optimum correlation thereof for determining which received RFID codes of the plurality of received RFID codes corresponds to the received object data, and that the determined RFID code is decoded from the RFID tag data that corresponds to the RFID tag intended to be read, and if a correlation does not exist, determining that a misread occurred.

20. The verification system according to claim 17, wherein the means for comparing determines if the comparison is within a predetermined image recognition certainty threshold.

* * * * *

UNITED STATES PATENT AND TRADEMARK OFFICE
CERTIFICATE OF CORRECTION

PATENT NO.       : 7,066,388 B2
APPLICATION NO.  : 10/385941
DATED            : June 27, 2006
INVENTOR(S)      : He et al.

It is certified that error appears in the above-identified patent and that said Letters Patent is hereby corrected as shown below:

Title Page illustrating Figure should be deleted and replaced with Title Page illustrating Figure. (Attached)

Please replace the informal drawings in the above application with the attached formal drawings, Figs. 1-6 (6 sheets).

Signed and Sealed this

Twenty-third Day of October, 2007

JON W. DUDAS
*Director of the United States Patent and Trademark Office*

(12) United States Patent
He

(10) Patent No.: US 7,066,388 B2
(45) Date of Patent: Jun. 27, 2006

(54) SYSTEM AND METHOD FOR VERIFYING RFID READS

(75) Inventor: Duanfeng He, South Setauket, NY (US)

(73) Assignee: Symbol Technologies, Inc., Holtsville, NY (US)

(*) Notice: Subject to any disclaimer, the term of this patent is extended or adjusted under 35 U.S.C. 154(b) by 104 days.

(21) Appl. No.: 10/385,941

(22) Filed: Mar. 11, 2003

(65) Prior Publication Data
US 2004/0118916 A1 Jun. 24, 2004

Related U.S. Application Data

(60) Provisional application No. 60/434,519, filed on Dec. 18, 2002.

(51) Int. Cl.
*G06K 15/00* (2006.01)

(52) U.S. Cl. ............... 235/383; 235/385; 235/472.01; 235/472.02

(58) Field of Classification Search ............... 235/447, 235/454, 462.25–462.29, 472.01, 0.02, 383, 235/385; 902/6; 340/568.1, 568.2, 570
See application file for complete search history.

(56) References Cited

U.S. PATENT DOCUMENTS

| 5,386,103 | A | * | 1/1995 | DeBan et al. ............... 235/379 |
| 5,493,107 | A | | 2/1996 | Gupta et al. |
| 5,640,002 | A | * | 6/1997 | Ruppert et al. .......... 235/462.46 |
| 5,821,523 | A | * | 10/1998 | Bunte et al. ........... 235/472.01 |
| 6,056,199 | A | * | 5/2000 | Wiklof et al. ........... 235/462.45 |
| 6,264,106 | B1 | | 7/2001 | Bridgelall |
| 6,318,636 | B1 | | 11/2001 | Reynolds et al. |
| 6,330,975 | B1 | * | 12/2001 | Bunte et al. ........... 235/472.01 |
| 6,371,375 | B1 | | 4/2002 | Ackley et al. |
| 6,545,705 | B1 | * | 4/2003 | Sigel et al. ............... 348/157 |
| 6,672,512 | B1 | * | 1/2004 | Bridgelall ............... 235/462.46 |
| 6,707,381 | B1 | * | 3/2004 | Maloney ............... 340/568.1 |
| 6,761,316 | B1 | * | 7/2004 | Bridgelall et al. ...... 235/462.46 |

FOREIGN PATENT DOCUMENTS

| DE | 4341880 | 12/1993 |
| DE | 19720747 | 5/1997 |

* cited by examiner

*Primary Examiner*—Michael G. Lee
*Assistant Examiner*—Kimberly D. Nguyen
(74) *Attorney, Agent, or Firm*—Carter, DeLuca, Farrell & Schmidt LLP

(57) ABSTRACT

An RFID reader and imaging system is provided having a device for imaging an object associated with a tag whose RFID code is read by an RFID reader. The imaging device generates image data associated with the imaged object. Verification software executable on at least one processor of the system is provided for verifying whether the RFID code presented to be read and processed by the RFID reader and imaging system corresponds to the imaged object. The process of verification is performed by comparing the acquired image data or other data associated with the imaged object with the stored image data or other stored data corresponding with the RFID code read. Based on whether the acquired image data or other data substantially matches the stored image data or other stored data, the system verifies whether the appropriate RFID code was read.

20 Claims, 6 Drawing Sheets